(12) United States Patent
Fujime

(10) Patent No.: US 6,466,859 B1
(45) Date of Patent: Oct. 15, 2002

(54) CONTROL SYSTEM

(76) Inventor: Yoko Fujime, 2500 Shingai, Iwata-shi, Shizuoka-ken (JP)

( * ) Notice: Subject to any disclaimer, the term of this patent is extended or adjusted under 35 U.S.C. 154(b) by 0 days.

(21) Appl. No.: 09/324,750

(22) Filed: Jun. 3, 1999

(51) Int. Cl.[7] .............................................. G06F 9/445
(52) U.S. Cl. ........................... 701/106; 700/50; 700/58; 706/45
(58) Field of Search ..................... 706/45, 58; 701/106; 700/50, 58

(56) References Cited

U.S. PATENT DOCUMENTS

| 4,535,736 A | * | 8/1985 | Taura et al. ................. 123/344 |
| 5,035,219 A | * | 7/1991 | Ohkuma et al. ....... 123/406.33 |
| 5,200,898 A | * | 4/1993 | Yuhara et al. ............... 701/106 |
| 5,247,445 A | * | 9/1993 | Miyano et al. .............. 701/106 |
| 5,430,642 A | * | 7/1995 | Nakajima et al. ............. 700/50 |
| 5,483,945 A | | 1/1996 | Kobayashi et al. .......... 123/374 |
| 5,524,599 A | * | 6/1996 | Kong et al. ................. 123/682 |
| 5,541,832 A | * | 7/1996 | Nakajima et al. ............. 700/28 |
| 5,568,799 A | * | 10/1996 | Akazaki et al. ............. 123/480 |
| 5,638,492 A | * | 6/1997 | Maeda et al. .................. 706/45 |
| 5,642,722 A | * | 7/1997 | Schumacher et al. ........ 123/673 |
| 5,743,244 A | * | 4/1998 | Bush et al. .................. 123/674 |
| 5,954,783 A | * | 9/1999 | Yamaguchi et al. ........ 701/106 |

FOREIGN PATENT DOCUMENTS

EP          0230372        12/1990

* cited by examiner

Primary Examiner—Thomas Black
Assistant Examiner—Michael B. Holmes

(57) ABSTRACT

An improved control system for controlling a machine such as a fuel injection system and a robot system. In a primary feature, the control system comprises means for actuating the subject, a partial learning system for learning an control parameter determining an input and output of the means for actuating the subject based upon an error between an objective amount and an output amount of the subject as educator data to adjust the control parameter and a whole learning system for learning an adjustment coefficient based upon the error as educator data to adjust the adjustment coefficient.

11 Claims, 12 Drawing Sheets

CONTROL SYSTEM

BACKGROUND OF THE INVENTION

1. Field of the Invention

This invention relates to a control system and more particularly to an improved control system most suitable to a fuel injection control of an engine.

2. Description of Related Art

Heretofore, there is a fuel injection system for an internal combustion engine wherein the engine has a fuel injector that injects fuel into an air intake passage so that the injected fuel is mixed with an air charge and then the mixture is admitted into a combustion chamber for combustion. In order to control the fuel injection system, an air fuel ratio (A/F) sensor is provided at an exhaust passage. This sensor is actually, for example, an oxygen ($O_2$) sensor that detects the density of oxygen in emissions whereby the air fuel ratio of the mixture is measured. The fuel injection system is also provided with a feedback control device that controls the amount of fuel injected into the air intake passage based upon the sensed actual air fuel ratio so that the actual air fuel ratio can close to an objective air fuel ratio. Through the control, eventually improvements in the engine performance, emissions and fuel efficiency is expected.

The fuel injection system described above may provide a number of advantages if the amount of intake air (hereunder referred to as "air amount") can be accurately measured and also the amount of injected fuel is under strict control in response to the air amount. However, actually, the air amount and the fuel amount can fluctuate due to various reasons. Accordingly, the actual air fuel ratio deviates from the objective air fuel ratio.

Some of the reasons are as follows:

That is, whole of the injected fuel may not be mixed with an air charge. A part of the fuel adheres on an inner wall of the air intake passage. Such adhered fuel evaporates sooner or later. However, the amount of evaporation of the fuel depends on the time constant of evaporation that is determined with the temperature of the inner wall of the air intake passage (hereunder referred to as "intake wall temperature") and other running conditions of the engine. Also, the rate of adhesion of the fuel on the inner wall fluctuates in response to changes in the running conditions. Hereunder, therefore, the amount of the fuel that is injected will be referred to as "injected fuel amount" and the amount of the fuel that is actually burnt will be simply referred to as "fuel amount". Further, the air amount fluctuates with changes in environmental conditions that occur, for example, in the intake temperature and the atmospheric pressure surrounding the engine, and moreover aging (deterioration with age) of the engine per se such as a kind of disorder of valve timings.

In order to resolve the problems noted above, one idea is proposed in the U.S. patent application Ser. No. 08/949,838, U.S. Pat. No. 5,954,783. This application discloses a control system wherein a control device is provided which has a learning model for figuring out a presumed air amount and a presumed fuel amount to be learned in response to engine running conditions. The learning model is formed with, for example, a fuzzy neural network. The control device learns, on a real-time basis or an on-line basis, the presumed air amount and the presumed fuel amount based upon the difference between the objective air fuel ratio and the actual air fuel ratio and then controls the fuel amount in a feed-forward control manner. The control method, thus, deals well with the problems occurring from the deviation between a theoretical amount and an actual amount, the transitional conditions, the changes in environmental conditions and the aging. The learning on the real-time basis or the on-line basis will be referred to as "on-line learning" hereunder.

However, in this conventional control system, when environmental conditions surrounding the engine change violently, a large difference occurs in control between using a leaned part and using a not-learned part because the control device can only learn a part in which educator data (engine control conditions) have been already obtained.

This problem will be described with reference to FIGS. 1A & 1B.

FIGS. 1A & 1B illustrates a couple of three dimensional graphs showing results of learning as to the relationships among the engine speed N, the throttle valve opening and the volumetric efficiency Ve. The volumetric efficiency means a volumetric ratio of an induced air charge volume per stroke versus a cylinder volume. Generally, the lower the atmospheric pressure is, the smaller the volumetric efficiency is. Thus, the volumetric efficiency at the summit of a high mountain is smaller than that at the foot of the mountain and at the half of the mountain it is also the half of them. FIG. 1A shows a situation before ascending halfway (5 gohme) of Mount Fuji, while FIG. 1B shows another situation after descending from there to the foot of the same mountain. Because of the differences in loads on the engine between ascending and descending a mountainside, respective ranges, in which the throttle valve opens, are different to each other. Accordingly, the control map that is made after learning of the descending situation is no longer the same one that was made before learning of the ascending situation. Thus, the control device can not figure out accurate air amounts for the appropriate control.

This situation arises because the control device recognizes that the drop in atmospheric pressure is a kind of aging or a semi-permanent change because the change continues for relatively a long period and then modifies the control mode to be adapted to this changed environment. In addition to this, the on-line learning method rewrites a control map every moment. The renewal of the map occurs not only as to the changed condition but also as to other conditions relating to the changed condition. Further, once the renewal is completed, it is not easy to return to the previous state even though the given condition is removed.

These are problems of the control system using the on-line learning model, although it has a number of advantages.

Although the problems are described above in connection with the fuel injection control of the engine, other controls may have the same problems. For example, in a robot control, temporary changes in "emotion" of a robot can exert influence on the control of "personality" of the robot if the temporary changes continue for a relatively long period of time.

It is, therefore, a principal object of this invention to resolve the abovenoted problems in conventional control systems.

In order to resolve the problems, there would be one idea wherein an adjustment control as to environmental changes in a relatively short period is provided in addition to a basic control (corresponding to the conventional control) as to partial changes including aging in a relatively long period. However, the adjustment control and the basic control are likely to interfere relative to each other.

It is, therefore, another object of this invention to provide a control system whereby the interference of a basic control with an adjustment control is almost nothing or the minimum so that undesirable biased control will be precluded.

SUMMARY OF THE INVENTION

In accordance with one aspect of this invention, a method is for controlling performance of a machine by a control system, which machine is operable by a causative signal, the performance of which machine is indicatable by an indicative signal, wherein the indicative signal outputted from the machine deviates from a pre-set target value of the indicative signal due to an internal change and an external change of the machine while operating the machine.

The control system comprises;

(i) a control unit programmed to output a causative signal when receiving pre-selected signals, wherein the input-output relationship of the control unit is regulated by control parameters;

(ii) a parameter-outputting unit programmed to output a control parameter to the control unit at a parameter-outputting unit connection when the parameter-outputting unit receives pre-selected signals; and (iii) a compensation-outputting unit programmed to output a compensation signal to the control unit at a compensation-outputting unit downstream of the parameter-outputting unit connection when receiving pre-selected signals.

The method comprises the steps of:

(a) detecting a discrepancy between the indicative signal outputted from the machine and the pre-set target value of the indicative signal;

(b) modifying the control parameter to compensate for the detected discrepancy, whereby the internal change in the machine is compensated for; and (c) modifying the compensation signal to compensate for the detected discrepancy, whereby the external change of the machine is compensated for.

In accordance with another aspect of this invention, a control system is for controlling performance of a machine, which machine is operable by a causative signal, the performance of which machine is indicatable by an indicative signal, wherein the indicative signal outputted from the machine deviates from a pre-set target value of the indicative signal due to an internal change and an external change of the machine while operating the machine.

The control system comprises;

a control unit programmed to output a causative signal when receiving pre-selected signals, wherein the input-output relationship of the control unit is regulated by control parameters;

a parameter-outputting unit programmed to output a control parameter to the control unit at a parameter-outputting unit connection when the parameter-outputting unit receives pre-selected signals, wherein the input-output relationship is regulated by coefficients, the coefficients being adjusted to modify the input-output relationship to compensate for a discrepancy between the indicative signal outputted from the machine and the pre-set target value of the indicative signal, whereby the internal change in the machine is compensated for; and a compensation-outputting unit programmed to output a compensation signal to the control unit at a compensation-outputting unit downstream of the parameter-outputting unit connection when receiving pre-selected signals, wherein the input-output relationship is regulated by coefficients, the coefficients being adjusted to modify the input-output relationship to compensate for a discrepancy between the indicative signal outputted from the machine and the pre-set target value of the indicative signal, whereby the external change of the machine is compensated for.

BRIEF DESCRIPTION OF THE DRAWINGS

As noted above,

FIG. 13A shows a result using the partial learning. FIG. 13B shows a result using the combination of the partial learning and the whole learning.

DETAILED DESCRIPTION OF THE PREFERRED EMBODIMENTS OF THE INVENTION

The control system of this invention will now be described with reference to some preferred embodiments shown in the figures.

Figure 1A:
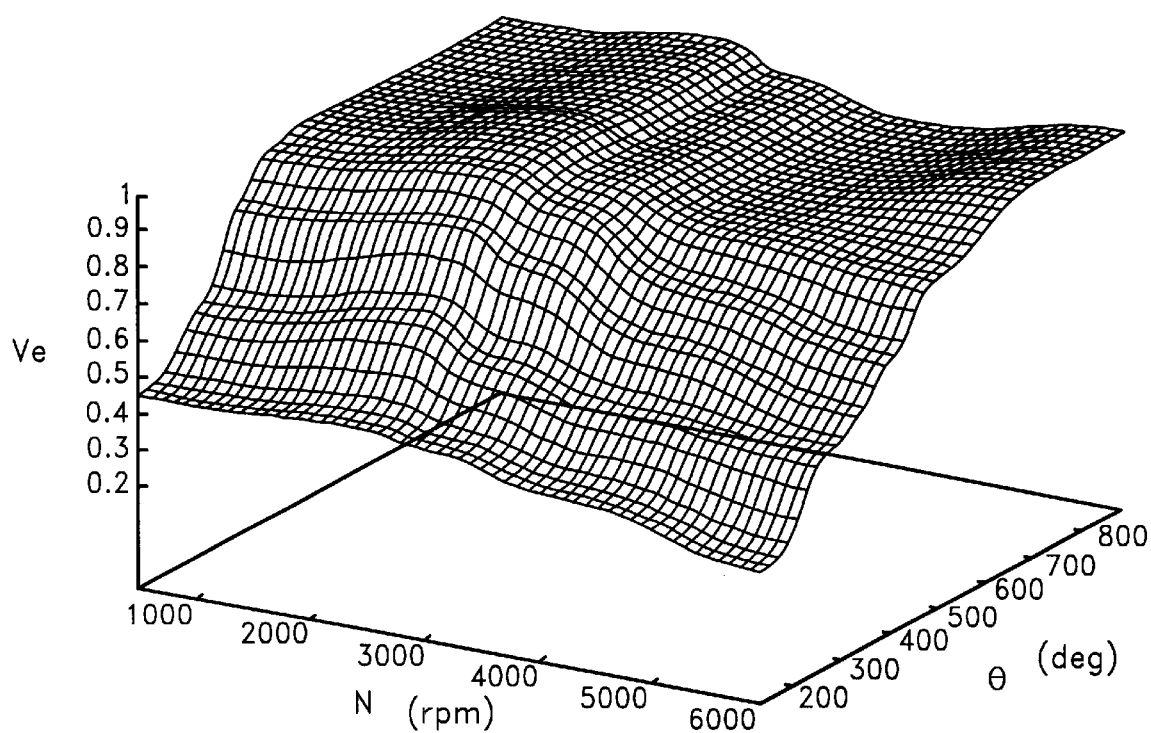
FIGS. 1A & 1B illustrates a couple of three dimensional graphs showing results of learning as to the relationships among the engine speed, the throttle valve opening and volumetric efficiency. The top graph shows a situation before ascending halfway (5 gohme) of Mount Fuji, while the bottom graph shows another situation after descending from there to the foot of the same mountain. These graphs are provided in order to assist the reader's better understanding of the differences in the control map before ascending and after descending of a mountain.
Figure 1B:
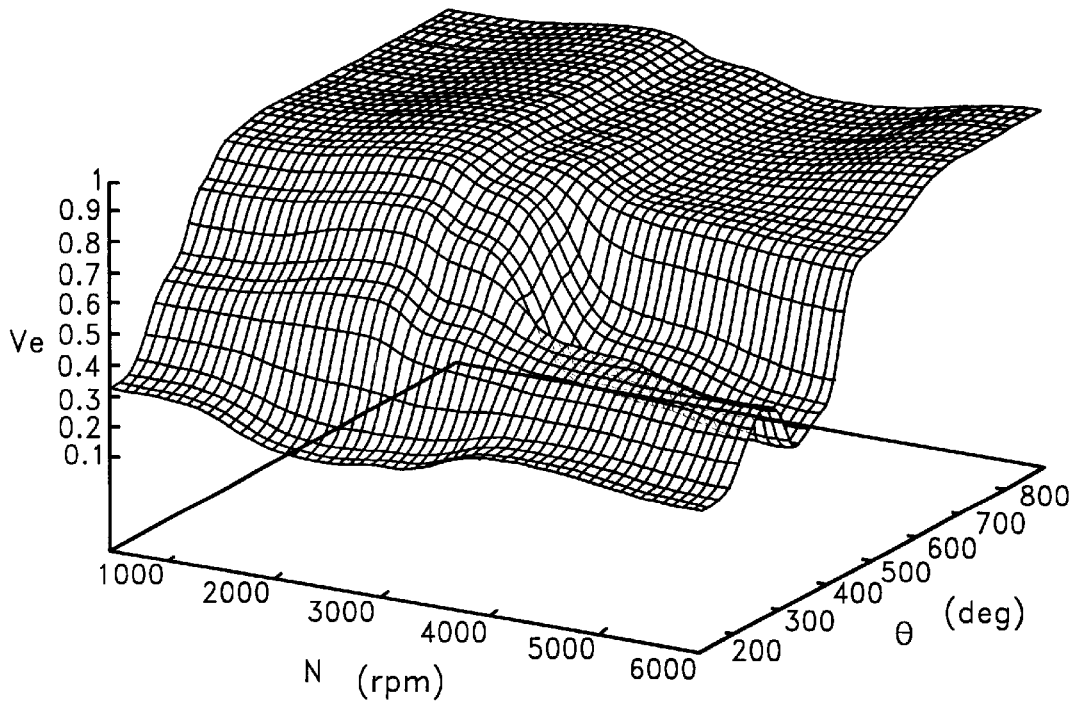
Figure 2:
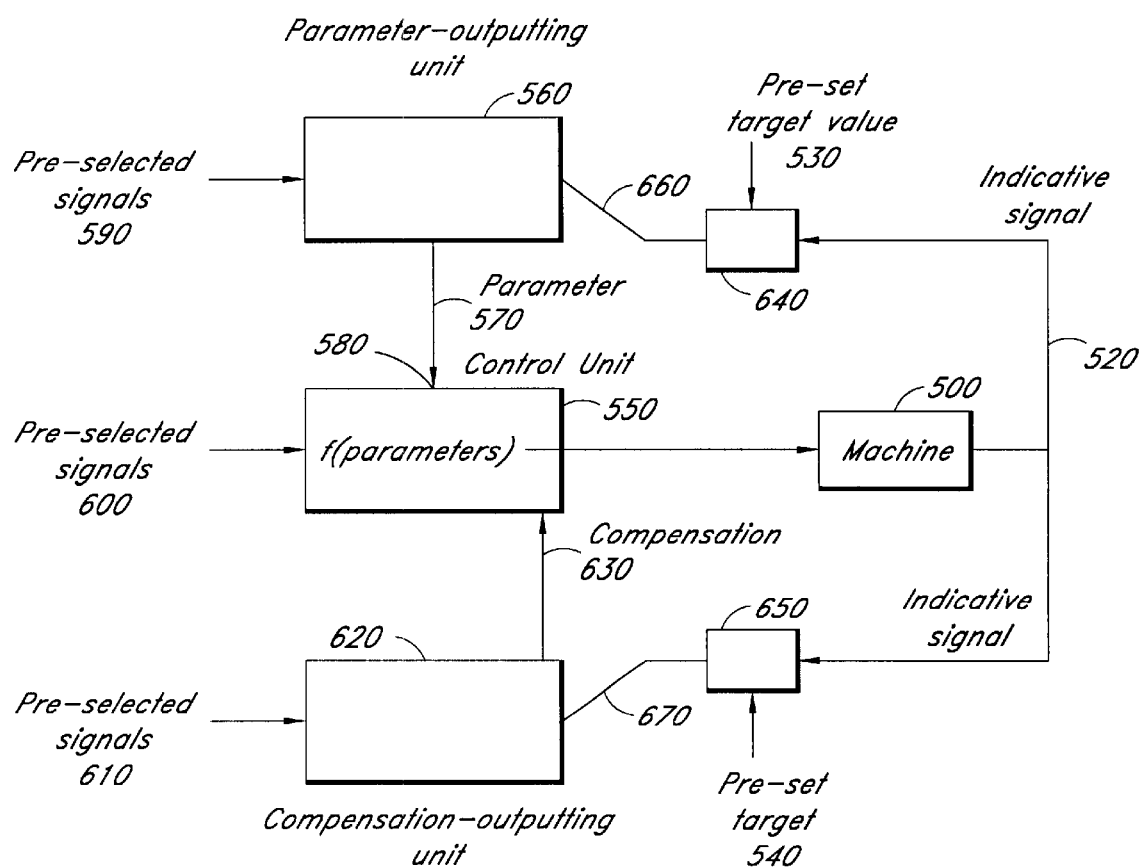
FIG. 2 is a block diagram showing the principle of this invention.

The Principle of This Invention (FIG. 2)

FIG. 2 illustrates a block diagram to show the principle of this invention.

A machine or controlled subject such as an engine and a robot is controlled by a control system. The machine is operable by a causative signal. The performance of the machine is indicatable by an indicative signal, wherein the indicative signal outputted from the machine deviates from a pre-set target value of the indicative signal due to an internal change and an external change of the machine while operating the machine. The internal change and the external change will be also called as "a partial change" and "a whole change", respectively, in the following descriptions.

The control system includes a control unit. The control unit is programmed to output a causative signal when it receives pre-selected signals, wherein the input-output relationship of the control unit is regulated by control parameters. The control system also includes also parameter-outputting unit. This parameter-outputting unit is programmed to output a control parameter to the control unit at a parameter-outputting unit connection when the parameter-outputting unit receives pre-selected signals. The control system further includes a compensation-outputting unit. The compensation-outputting unit is programmed to output a compensation signal to the control unit at a compensation-outputting unit downstream of the parameter-outputting unit connection when it receives pre-selected signals.

By means of the control system described above, a control method includes the following three steps. The first step is to detect a discrepancy between the indicative signal outputted from the machine and the pre-set target value of the indicative signal. The second step is to modify the control parameter to compensate for the detected discrepancy, whereby the internal change is the machine is compensated for. The third step is to modify the compensation signal to compensate for the detected discrepancy, whereby the external change of the machine is compensated for.

The principle of this invention will be more apparent with the descriptions about preferred embodiments disclosed hereunder.

Figure 3:
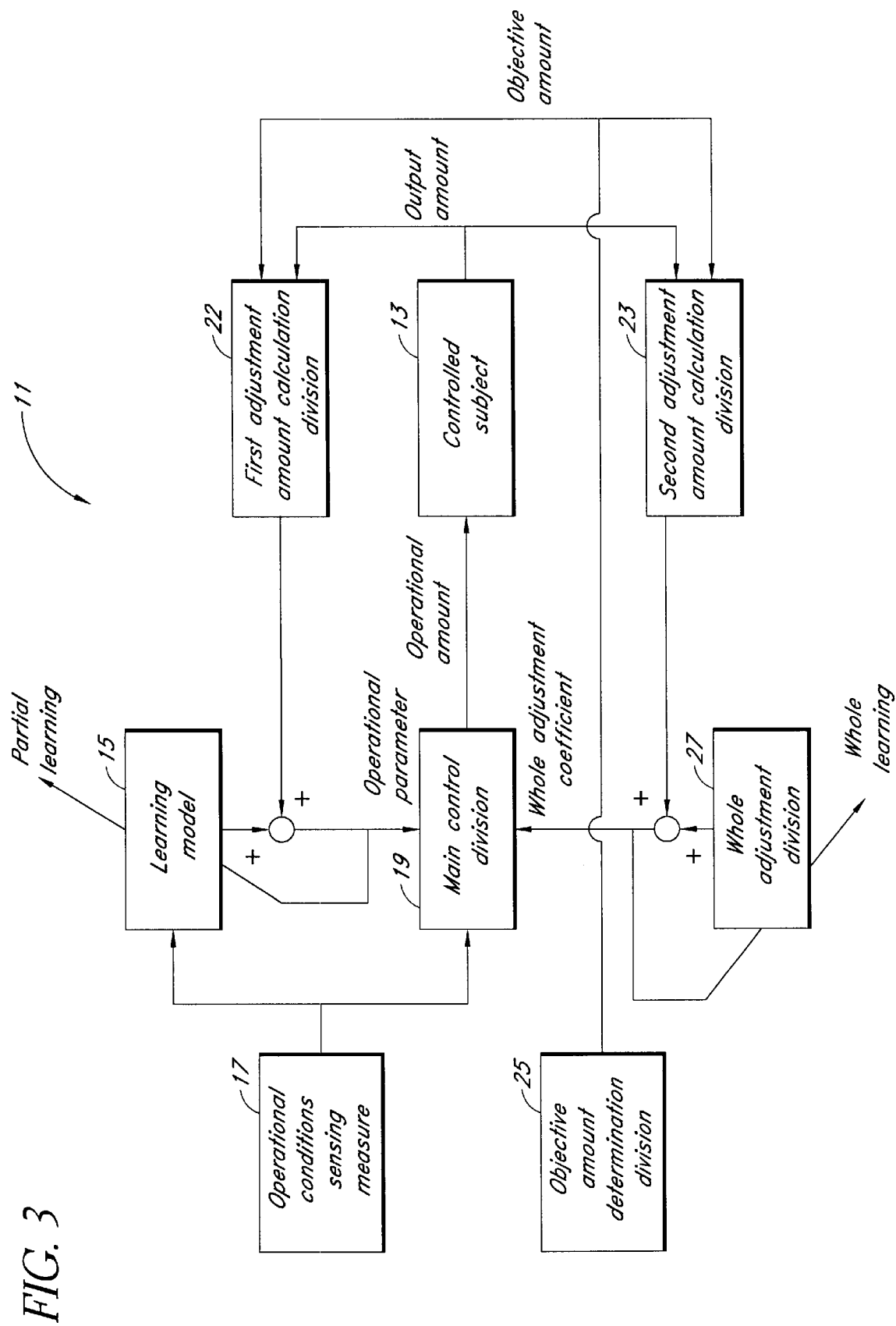
FIG. 3 is a block diagram showing a preferred general embodiment of a method for an on-line learning of this invention.

General Embodiment of This Invention (FIG. 3)

FIG. 3 illustrates a block diagram to show a preferred general embodiment of a control system of this invention.

A control system is indicated generally by the reference numeral 11. The control system 11 controls the machine 13. A learning model 15 is provided for figuring out control parameters to be learned in response to operational conditions of the machine 13. The learning model 15 is fed back with the difference value between an objective value and an actual value and learns the control parameters on a real time basis or on-line basis.

This learning will be referred to as "a partial learning". The partial learning is associated with a control as to internal changes such as aging.

The learning model 15, then, controls the machine 13 in a manner of a feed-forward control. For this control, the control system 11 has following divisions.

A sensing measure 17 is provided to sense operational conditions of the machine 13. The sensing measure 17 supplies signals to the learning model 15 and a main control division 19. The learning model 15 calculates the control parameters based upon the signals and supplies the control parameters to the main control division 19. The main control division 19 calculates an operational amount based upon the operational conditions, control parameters and whole adjustment coefficients which will be described shortly, and supplies the operational amount to the machine 13. The machine 13 outputs an actual amount that is under the control to a first adjustment amount calculation division 21, which calculates amounts to be adjusted with regard to partial changes, and a second adjustment amount calculation division 23, which calculates amounts to be adjusted with regard to whole changes.

An objective amount determination division 25 is also provided to supply an objective amount to the first adjustment amount calculation division 21 and the second adjustment amount calculation division 23. The first adjustment amount calculation division 21 calculates an adjusted amount based upon the actual amount and the objective amount so that the difference amount between the actual amount and the objective amount will be small and then adjusts the control parameters with the calculated amount. The adjusted control parameters are supplied to the main control division 19 and also fed back to the learning model 15 to be learned (the partial learning).

On the other hand, a whole adjustment division 27 is provided to memorize whole adjustment coefficients. The second adjustment amount calculation division 23 calculates an adjusted amount based upon the actual amount and the objective amount so that the difference amount between the actual amount and the objective amount will be small and then adjusts the whole adjustment coefficient with the calculated amount. The adjusted whole adjustment coefficients are supplied to the main control division 19 and also fed back to the whole adjustment division 27 to be learned. The whole adjustment coefficients will be used to adjust the operational amounts in the main control division 19.

This learning will be referred to as "a whole leaning". The whole learning is associated with a control as to changes advancing in a relatively short period such as environmental changes or external changes. In this embodiment, the whole learning is also done on the real-time basis or on-line basis. However, this can be done on a batch process basis or off-line basis.

In this embodiment, a learning rate GZ of the whole learning is selected to be larger than a learning rate GB of the partial learning, e.g., GZ/GB=10 to 100, so that whole changes do not exert influence onto the partial learning as possible. If an objective amount is T, an adjusted amount before adjustment is H, an adjusted amount after adjustment is H' and a learning rate, .i. e., gain, is G, the adjusted amount H' and the gain G are depicted as follows:

$$H'=(T-H)G+H$$

$$G=(H'-H)/(T-H)$$

It should be noted that the feed back control is not requisite.

Embodiment Adapted to Fuel Injection Control of Engine (FIGS. 4 to 13)

FIGS. 4 to 13A & 13B shows a preferred embodiment of this invention wherein the control system is adapted to a fuel injection control of an internal combustion engine.

Figure 4:
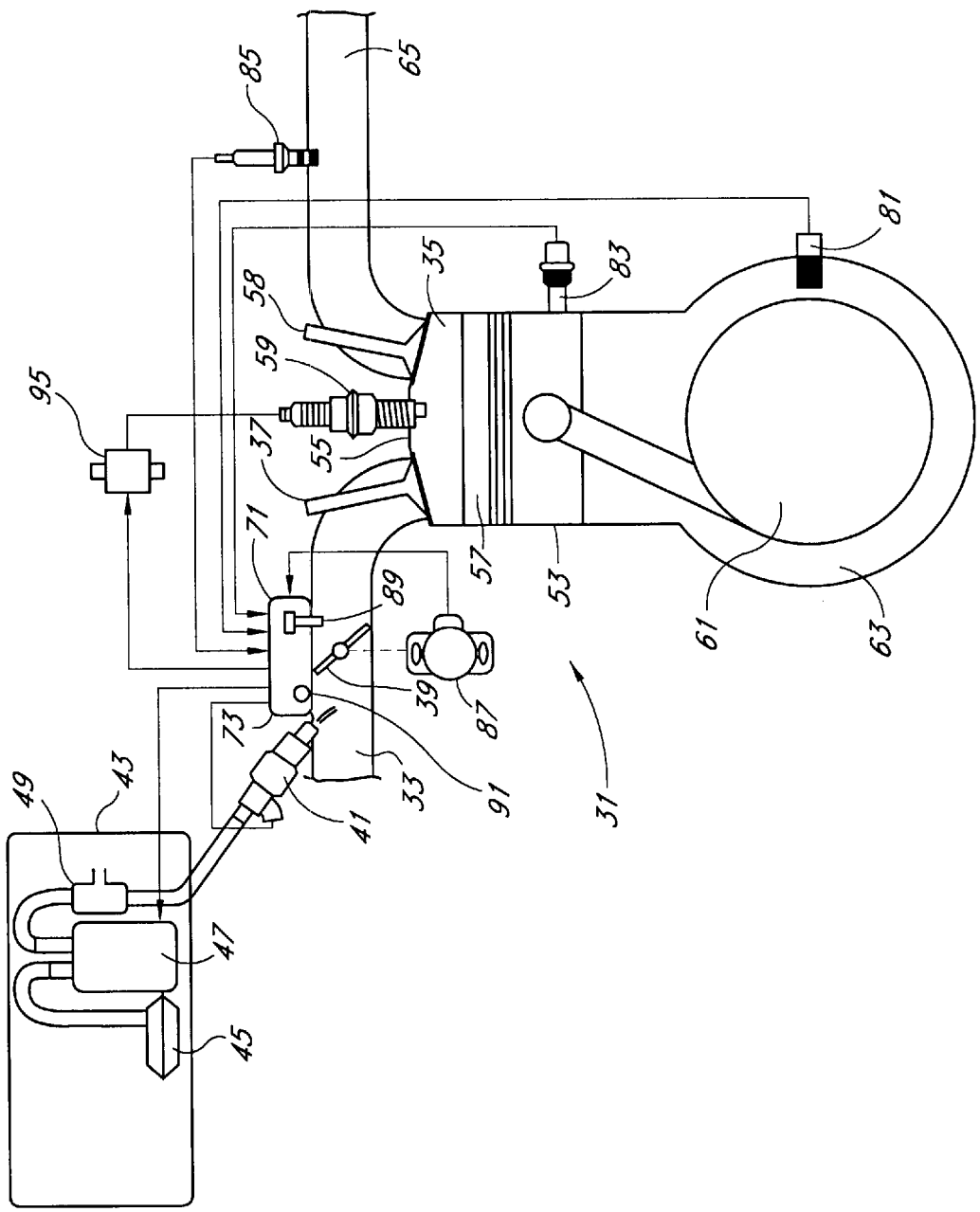
FIG. 4 is a schematic diagram showing an engine provided with a fuel injection system and a control device for controlling the fuel injection system, wherein the method for the on-line learning is applied.

FIG. 4 illustrates a schematic diagram to show the engine provided with a fuel injection system and a control device for controlling the fuel injection system.

The engine is indicated generally by the reference 31 and operates on a four stroke principle. This engine 31 has an air intake passage or device 33 that admits air charge into combustion chamber 35 through an intake valve 37. A throttle valve 39 is provided in the air intake passage 33 to control the amount of the air charge. The air intake passage 33 is also provided with a fuel injector 41, upstream of the throttle valve 39, that injects pressurized fuel into the air intake passage 33. A vapor separator 43 is provided to supply fuel that is supplied from a fuel tank (not shown) to the fuel injector 41. The vapor separator 43 has a filter 45, a fuel pomp 47 to pressurize the fuel and a pressure regulator 49.

The air charge is mixed with the injected fuel and then the mixture of the air charge. The mixture of the air charge and the injected fuel is induced into the combustion chamber 35. The combustion chamber 35 is defined by a cylinder block 53, a cylinder head 55, a piston 57 that reciprocates within the cylinder block 53 along an axis thereof, the intake valve 37 and an exhaust valve 58. A spark plug 59 is provided at the cylinder head 45 so as to be exposed into the combustion chamber 35. This spark plug 59 is fired to burn the mixture in the combustion chamber 35 to push down the piston 57 and then rotates a crankshaft 61 that is connected with the piston 57 and in a crankcase 63. Burnt mixture is discharged outside through the exhaust valve 58 and an exhaust passage 65 as emissions.

The ratio of the air charge versus the fuel (air fuel ratio or A/F) is very important factor for controlling the engine 31 because emissions and fuel efficiency depend on this air fuel ratio. A control device or ECU (electronic control unit) 71 is provided in a box 73 mounted on the intake passage 33. The control device 71 controls the air fuel ratio by changing amounts of the injected fuel from the fuel injector 41 in response to openings of the throttle valve 39. Inasmuch as the air fuel ratio is kept within an appropriate range, the combustion of the mixture and eventually the emissions from the exhaust passage 65 are maintained also in proper states.

Sensors are provided for sensing conditions of the engine 1 and sending signals associated with the sensed conditions to the control device 71.

The sensors provided in this embodiment are a crank angle sensor 81 affixed to the crankcase 63, an engine temperature sensor 83 affixed to the cylinder block 53, an air fuel ratio sensor 85 affixed to the exhaust passage 65, a throttle valve opening sensor 87, an intake passage negative pressure sensor 89 and an intake wall temperature sensor 91. The crank angle sensor 81 provides not only a signal of crank angle but also, by comparing that signal with time, an indication of engine speed (crankshaft rotational speed) signal. The engine temperature sensor 83 senses temperature of the cylinder body 53 or temperature of cooling water of the engine 31. The air fuel ratio sensor 85 is preferably an oxygen ($O_2$) sensor and can be affixed to the cylinder block 53 or the cylinder head 55 so as to be exposed to the combustion chamber 35.

The control device 71 controls the fuel injector 41, the fuel pomp 47 and the spark plug 59 via an igniter coil 95 based upon the sensed signals.

Figure 5:
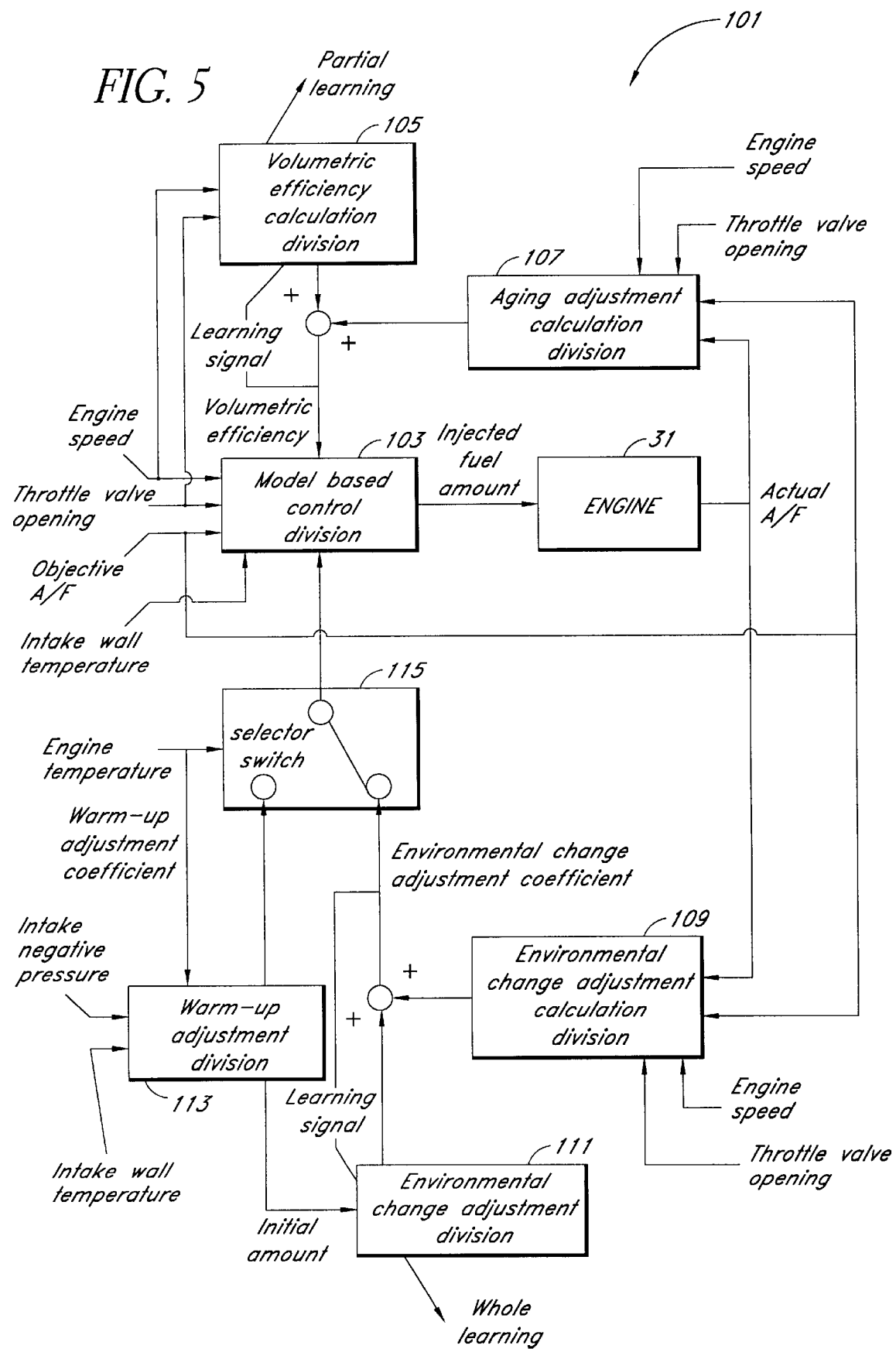
FIG. 5 is a block diagram showing the fuel injection control system in detail.

FIG. 5 illustrates a block diagram to show the fuel injection control system indicated generally by the reference numeral 101.

In this system 101, there are the engine 31 corresponding to the machine 13, a model based control division 103 corresponding to the main control division 19, a volumetric efficiency calculation division 105 corresponding to the learning model 15, a first adjustment calculation division 107, which calculates adjusted amounts of aging, corresponding to the first adjustment calculation division 21, a second adjustment calculation division 109, which calculates adjusted amounts of the environmental change, corresponding to the second adjustment calculation division 23 and an environmental change adjustment division 111 corresponding to the whole adjustment division 27 (the corresponding components are shown in FIG. 3). In addition, a worming-up adjustment division 113 is provided and also a selector switch 115 is provided for switching from the environmental change adjustment division 111 to the worming-up adjustment division 113 and vice versa. The switching is done based upon the engine temperature sensed by the engine temperature sensor 83 (FIG. 4). If the engine temperature is lower than a predetermined temperature, the selector switch 15 is connected to the warm-up adjustment division 113. Otherwise, the selector switch 115 is connected to the environmental change adjustment division 111. The first adjustment calculation division 107 that calculates adjusted amounts of the aging will be hereunder referred to as "aging adjustment calculation division". Also, the second adjustment calculation division 109 that calculates adjusted amounts of the environmental change will be referred hereunder to as "environmental change adjustment calculation division".

The model based control division 103 calculates the fuel amount based upon the engine speed, the throttle opening, the objective A/F, the volumetric efficiency and the whole adjustment coefficient and then supplies a signal to the engine. The volumetric efficiency calculation division 105 calculates the volumetric efficiency based upon the engine speed and the throttle valve opening and supplies a signal to the model based control division 103. At this time, the aging adjustment calculation division 107 calculates an adjusted amount of the aging so that the difference amount between the objective A/F and the actual A/F will be as small as possible and adjusts the volumetric efficiency. Simultaneously, the volumetric efficiency calculation division 105 learns the adjusted volumetric efficiency (learning signal) that is fed back. This is the partial learning and will be described more in detail.

Meanwhile, the environmental adjustment division 111 preserves the environmental adjustment coefficient. The environmental change adjustment calculation division 109 calculates an adjusted amount of the environmental change so that the difference amount between the objective A/F and the actual A/F will be as small as possible and adjusts the environmental adjustment coefficient. Simultaneously, the environmental adjustment division 111 learns the adjusted environmental adjustment coefficient (learning signal) that is fed back. This is the whole learning.

Since, usually, the combustion state does not steady and/or the sensors are not active enough immediately after the engine 31 has started, the air fuel ratio is also unstable. Because of this, when starting up (warming up) the engine 31, the selector switch 115 is changed over to the worm-up adjustment division 113 from the environmental adjustment division 111. Then, the warming-up adjustment division 113 calculates a worm-up adjustment coefficient based upon the atmospheric pressure (intake negative pressure) and the atmospheric temperature (intake wall temperature). After completion of the warm-up of the engine 31, the selector switch 115 is again changed over to the environmental adjustment division 111. The worm-up adjustment coefficient will be applied to an initial amount of the environmental adjustment division 111.

Thus, the environmental adjustment coefficient or the warm-up adjustment coefficient is utilized as the whole adjustment coefficient to adjust the air amount at the model based control division 103. Incidentally, the environmental adjustment coefficient may include a humidity-related coefficient.

Figure 6:
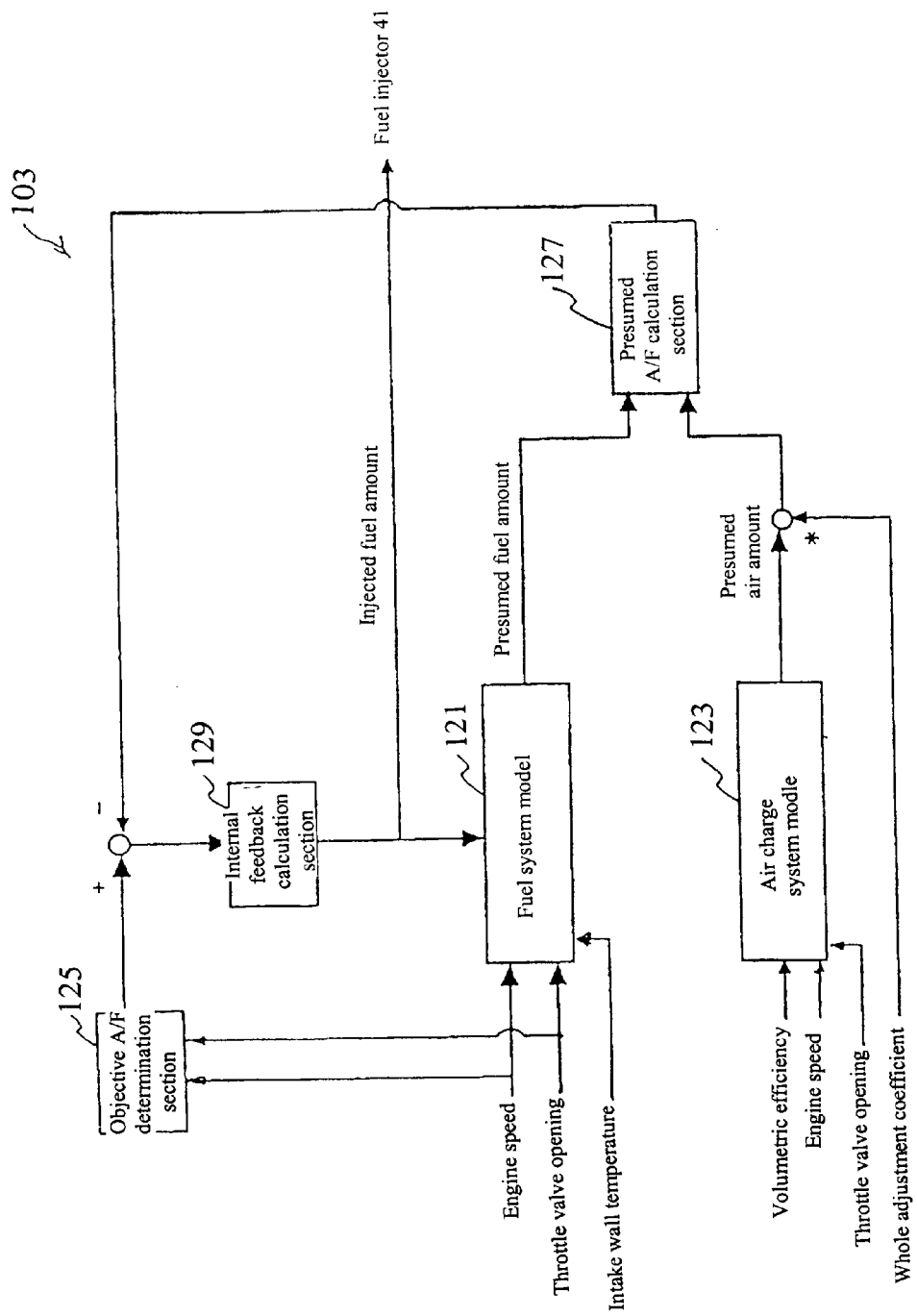
FIG. 6 is a block diagram showing the construction of a model based control division shown in FIG. 5.

FIG. 6 illustrates a block diagram to show the construction of a model based control division 103 shown in FIG. 4.

The model based control division 103 comprises a fuel system model 121, an air charge system model 123, an objective A/F determination section 125, a presumed A/F calculation section 127 and an internal feedback (F/B) calculation section 129. The fuel system model 121 presumes a fuel amount based upon the engine speed, the throttle valve opening and the intake wall temperature. The air charge system model 123 presumes an air amount based upon the engine speed, throttle valve opening and the volumetric efficiency. The objective A/F determination section 125 determines an objective air fuel ratio based upon the engine speed and the throttle valve opening. The presumed A/F calculation section 127 figures out a presumed air fuel ratio based upon the presumed air amount that is adjusted with the whole adjustment coefficient and the presumed fuel amount. The internal feedback calculation section 129 figures out a fuel amount that will be actually injected by the fuel injector 41 based upon the deviated amount between the determined objective air fuel ratio and the presumed air fuel ratio and send the fuel amount signal to the fuel injector 41 shown in FIG. 3 and also feed the signal back to the fuel system model 121. That is, the model based control division 103 has a reverse model in connection with the fuel system.

Figure 7:
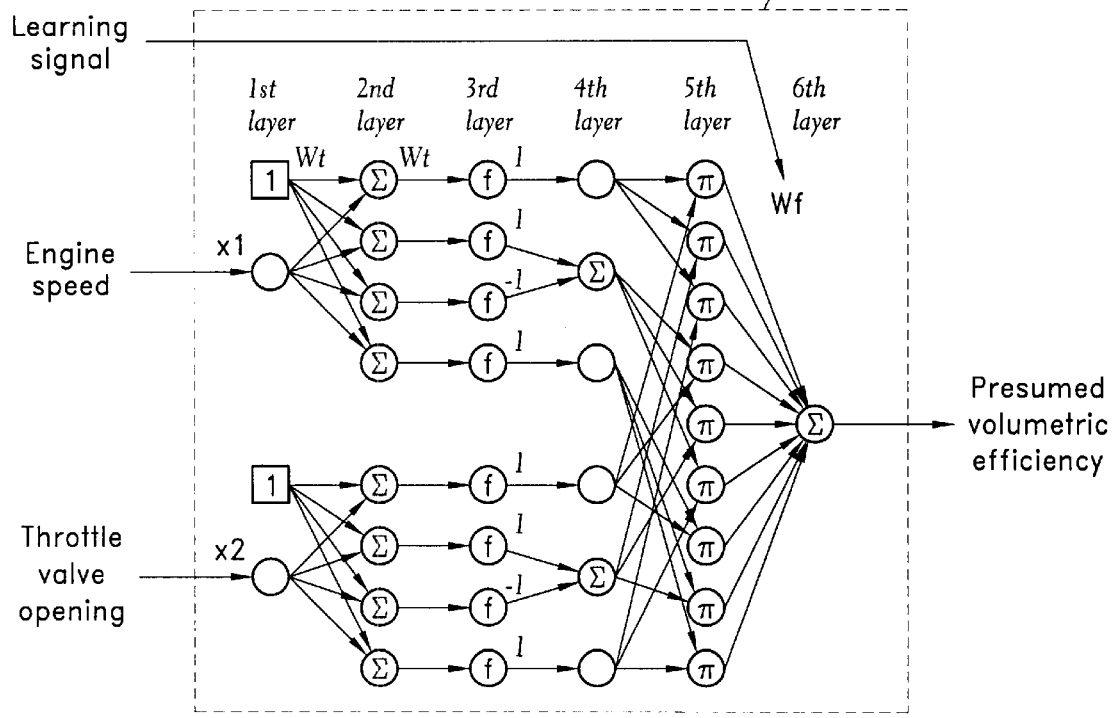
FIG. 7 is a schematic diagram showing a fuzzy neural network for calculating a presumed volumetric efficiency in a volumetric efficiency calculation division shown in FIG. 5.

FIG. 7 illustrates a schematic diagram to show a fuzzy neural network for calculating a presumed volumetric efficiency in the volumetric efficiency calculation division 105 shown in FIG. 5.

There is an equation to figure out the volumetric efficiency. However, the equation contains the air amount that cannot be specified as noted above. Accordingly, the fuzzy neural network is applied for modeling the volumetric efficiency. This fuzzy neural network is formed with the structure that has six layers. The first through fourth layers construct an antecedent part (if-part) of the fuzzy rule, while the fifth and sixth layers construct a consequent part (then-part) thereof. The engine speed and the throttle valve opening are provided to the fuzzy neural network as input signals. The fuzzy neural network reasons how many (grades) the engine speed and the throttle valve opening are adapted to a predetermined fuzzy rule (membership function). Then, using respective amounts of the engine speed and the throttle valve opening that are determined as amounts at the antecedent part, the consequent part calculates for a volumetric efficiency. That is, this volumetric efficiency is a presumed amount.

Figure 8:
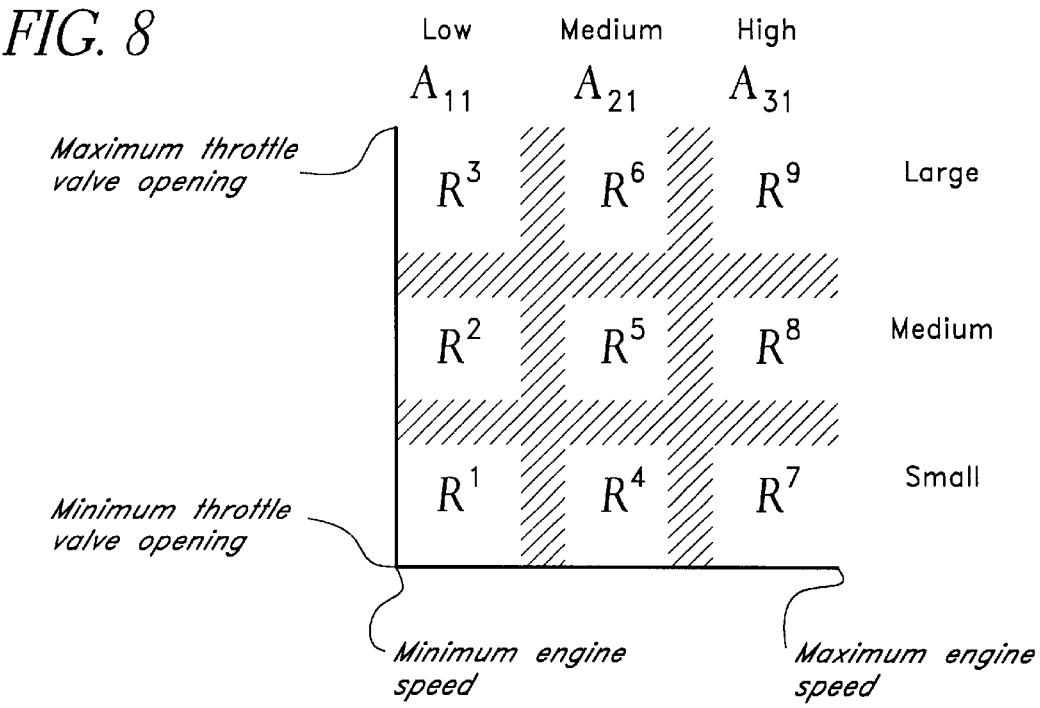
FIG. 8 is a block diagram showing the fuzzy rule, which is used in the fuzzy neural network shown in FIG. 7, as a form of a control map.

The fuzzy rule can be expressed with a matrix or map as shown in FIG. 8. The engine speed appears on the x-axis and the throttle valve opening appears on the y-axis. Each has three running conditions $A_{11}, A_{21}, A_{31}$ and $A_{12}, A_{22}, A_{32}$ and hence nine conclusions $R^1$ to $R^9$ appear in the map. The running conditions $A_{11}, A_{21}, A_{31}$ indicate that the engine speed is in a low speed range, medium speed range and high speed range, respectively. The other running conditions $A_{12}$, $A_{22}, A_{32}$ indicate that the throttle valve opening is small, medium and large, respectively. The conclusions $R^1$ to $R^9$ indicate presumed volumetric efficiencies corresponding to the respective combinations of the engine speed with the throttle valve opening. With these running conditions $A_{11}$, $A_{21}, A_{31}$ and $A_{12}, A_{22}, A_{32}$ and the conclusions $R^1$ to $R^9$, fuzzy rules are given as, for examples, "if the engine speed is in the medium range and the throttle valve opening is medium (antecedent part), then the presumed volumetric efficiency is 60% (consequent part)" or "if the engine speed is in the high speed range and the throttle valve opening is large (antecedent part), then the presumed volumetric efficiency is 90% (consequent part)".

The calculation for the engine speed and the other calculation for the throttle valve opening separately advance to each other. At the first layer, each of the engine speed signal and the throttle valve opening signal is given as an input signal xi(i=1 or 2). The second, third and fourth layers calculate each contribution rate aij of the input signals xi that correspond to the respective running conditions $A_{11}, A_{21}$, $A_{31}$ and $A_{12}, A_{22}, A_{32}$. More specifically, the contribution rate aij can be calculated with the sigmoidal function f (xi) indicated in the following equation (1).

$$\text{contribution rate } aij = f(xi) = 1/\{1+\exp[-wg(xi+wc)]\} \quad (1)$$

The parameters wc and wg are the coefficients relative to the center value and the inclination of the sigmoidal function, respectively.

The fifth layer calculates an adaptation degree $\mu i$ of the engine speed and the throttle valve opening to the conclusions $R^1$ to $R^9$ with the contribution rate aij using the following equation (2). Then, the fifth layer further calculates a normalized adaptation degree $\mu i$ of each conclusion using the following equation (3).

$$\text{Adaptation degree } \mu i = \pi j aij \quad (2)$$

$$\text{Normalized adaptation degree } \mu\ i = \hat{\mu}\ i \Big/ \sum_k \mu\ k \quad (3)$$

The sixth layer figures out a presumed volumetric efficiency Ve by calculating the weighted mean of the normalized adaptation degree and respective output values fi, i.e., output values corresponding to the respective conclusions $R^1$ to $R^9$ using the following equation (4).

$$\text{Presumed volumetric efficiency } Ve = \sum_i \hat{\mu}\ ifi$$

The volumetric efficiency calculating division 105 executes learning as follows. At the initial state, the volumetric efficiency calculating division 105 directly compares the volumetric efficiency that is obtained in an experiment with the volumetric efficiency that the fuzzy neural network provides. Then, the division 105 adjusts the respective rules of the fuzzy neural network, the coefficients wc and wg corresponding to the center value and the inclination of the sigmoidal function, respectively and further the coupling coefficient wf of the neural network so that the difference between the experimental volumetric efficiency and the same provided from the fuzzy neural network will be small. The fuzzy neural network learns this adjustment off-line. After that, the volumetric efficiency calculation division 105 executes the learning on-line through renewing the coefficients based upon the volumetric efficiency adjusted with the deviation of the air fuel ratio (the volumetric efficiency, thus, including the data associated with the engine speed and the throttle valve opening).

The environmental change adjustment division 111 has a fuzzy neural network structure. Since this structure is similar to the fuzzy neural network of the volumetric efficiency calculation division 105, further descriptions do not seem to be necessary.

Figure 9:
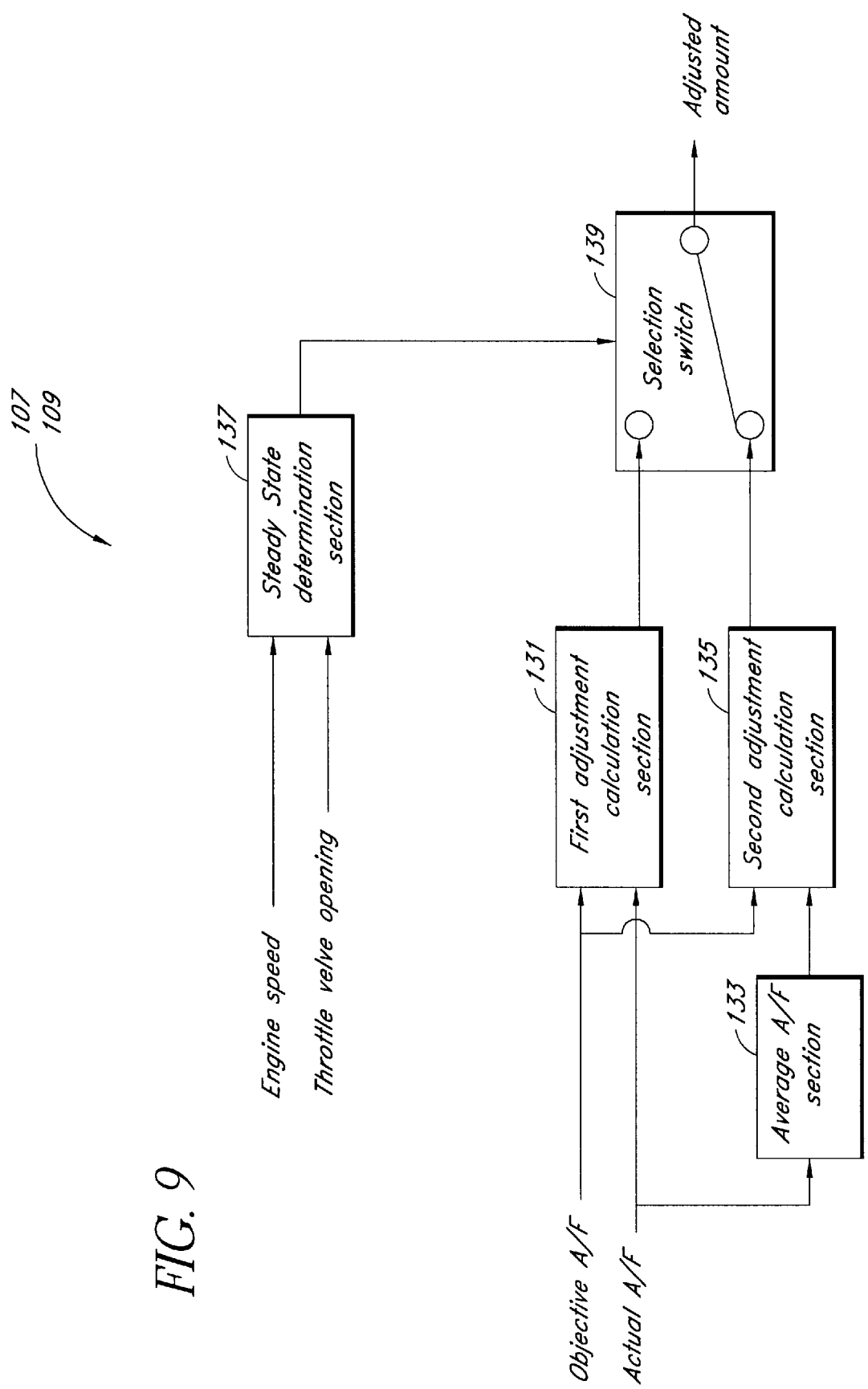
FIG. 9 is a block diagram showing a construction of an adjustment amount calculation division for adjusting changes by aging and also an adjustment amount calculation division for adjusting environmental changes shown in FIG. 5, both of which have the same construction.

FIG. 9 illustrates a block diagram to show a construction of the aging adjustment calculation division 107 and also the environmental change adjustment calculation division 109, shown in FIG. 4, both of which have the same construction.

The aging adjustment calculation division 107 and the environmental change adjustment calculation division 109 comprise a first adjustment calculation section 131, an average A/F calculation section 133, a second adjustment calculation section 135, a steady state determination section 137 and a selector switch 139. The first adjustment calculation section 131 is provided with an objective A/F and an actual A/F and figures out an adjusted amount so that the difference between them will be small. The average A/F section 133 is provided with the actual A/F and figures out an average A/F. Although there are various ways to figure out the average A/F, in this embodiment it is calculated in a manner wherein the total amounts of the actual A/F in a predetermined period of time, e.g., 10 seconds, is divided by the number of the actual A/F data. The second adjustment calculation section 135 is provided with the objective A/F and the average A/F and figures out an adjusted amount so that the difference between them will be small. The steady state determination section 137 is provided with an engine speed and a throttle valve opening and determines whether it is steady state or transitional state based upon each change rate. The selector switch 139 is provided the determination signal from the steady state determination section 137. If the determination indicates the steady state, the selector switch 139 selects the adjusted amount from the first adjustment calculation section 131 to output. If, on the other hand, the determination indicates the transitional state, the selector switch 139 selects the adjusted amount form the second adjustment calculation section 135 to output.

It should be noted that another statistical alteration is practicable as substitute for the average A/f.

It should be also noted that the actual A/F is applicable for the adjustment as to the deterioration with age at the aging adjustment calculation division 107 without any change even if the determination indicates the transitional state. Because, the gain in this adjustment is set small in comparison with the gain in the adjustment as to the environmental change.

Figure 10:
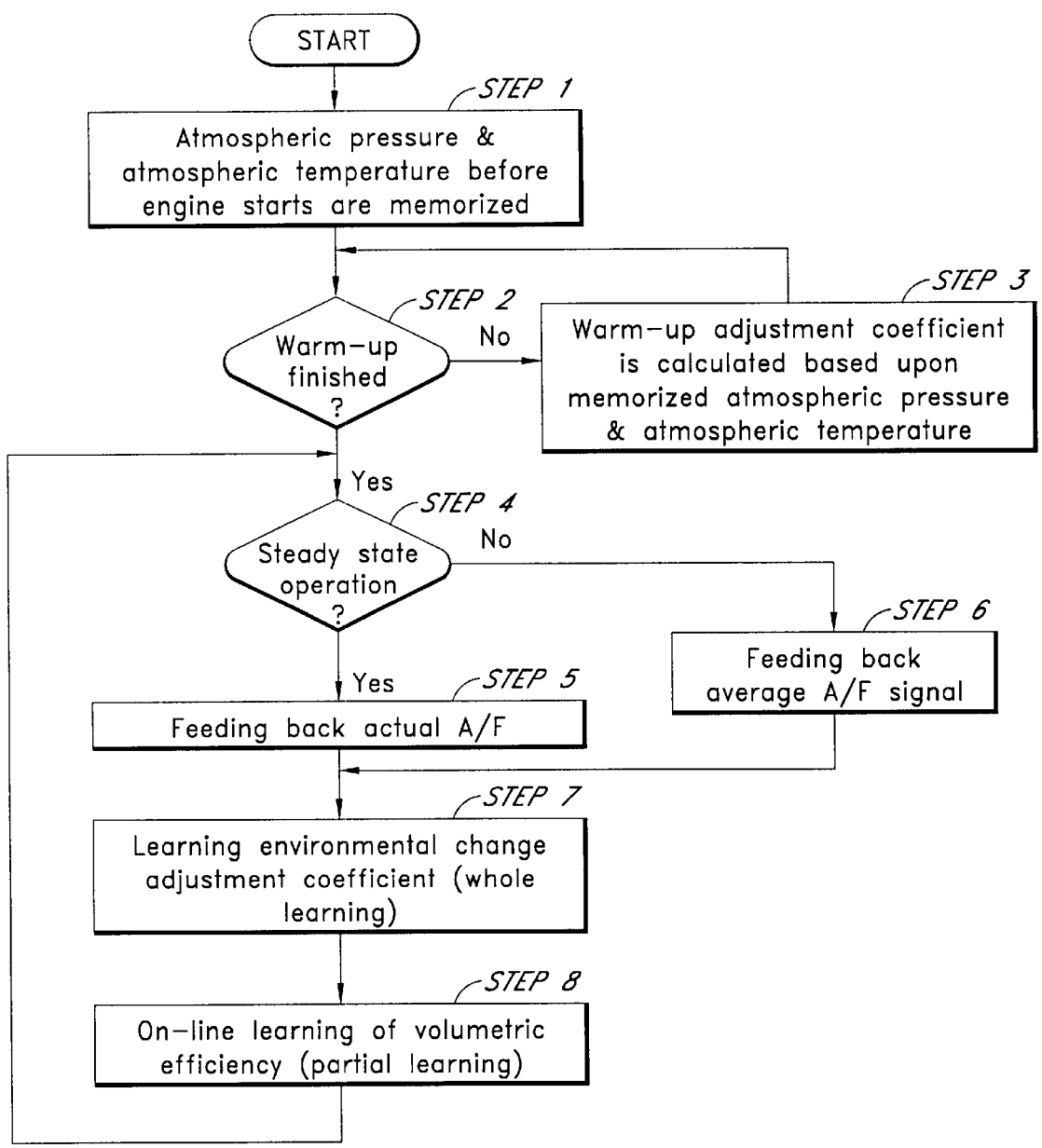
FIG. 10 is a flow chart showing a control routine of the learning executed in the control division shown in FIG. 5.

FIG. 10 illustrate a flow chart to show a control routine of the learning executed in the control division shown in FIG. 5.

The routine starts and goes to the step 1. At this step 1, an atmospheric pressure and an atmospheric temperature before the engine 31 starts are memorized. Then, at the step 2, it is determined whether the warm-up is finished based upon the engine temperature signal sensed by the engine temperature sensor 83 (FIG. 4). If it is negative, i.e., in the warming up state, the control routine goes to the step 3. A warm-up adjustment coefficient is calculated based upon the memorized atmospheric pressure and atmospheric temperature and then the warm-up adjustment is executed in the warm-up adjustment division 113 (FIG. 5). As noted above, the selector switch 115 (FIG. 5) is connected to the warm-up adjustment division 113 under this condition.

When the warm-up is completed, the routine goes to the step 4. The selector switch 115 is turned over to the environmental change adjustment division 111. At this step, it is determined whether the engine 31 operates in the steady state or in a transitional state at the pair of steady state determination sections 137 in both of the aging adjustment calculation division 107 and the environmental change adjustment calculation division 109. If it is positive, i.e., the engine 31 operates in the steady state, the routine goes to step 5. The steady state determination section 137 switches the selector switch 139 to the first adjustment calculation section 131 so as to feed back an actual A/F signal to the model based control division 103 and also both of the volumetric efficiency calculation division 105 and the environmental change adjustment division 111.

Otherwise, i.e., the engine 31 operates in a transitional state, the control routine goes to the step 6. The selector switch 139 is set to the second adjustment calculation section 135 so as to feed back an average A/F signal provided by the average A/F calculation section 133 the model based control division 103 and also both of the volumetric efficiency calculation division 105 and the environmental change adjustment division 111.

The average A/F is, as described above, the amount that is calculated in a manner wherein the total amounts of the actual A/F in 10 seconds is divided by the number of the actual A/F data.

Next, the control routine goes to the step 7 and the environmental change adjustment division 111 executes the learning of an environmental change adjustment coefficient (whole learning). Then, the control routine goes to the step 8 and the volumetric efficiency adjustment division 105 executes the learning of a volumetric efficiency on-line (partial learning).

After that, the control routine repeats the steps 4 to 8 until the engine operation finishes.

In this embodiment associated with the fuel injection control of an engine, like the embodiment shown in FIG. 3, the learning rate GZ of the whole learning is selected to be larger than a learning rate GB of the partial learning, e.g., GZ/GB=10 to 100, so that whole changes do not exert influence onto the partial learning as possible.

Figure 11:
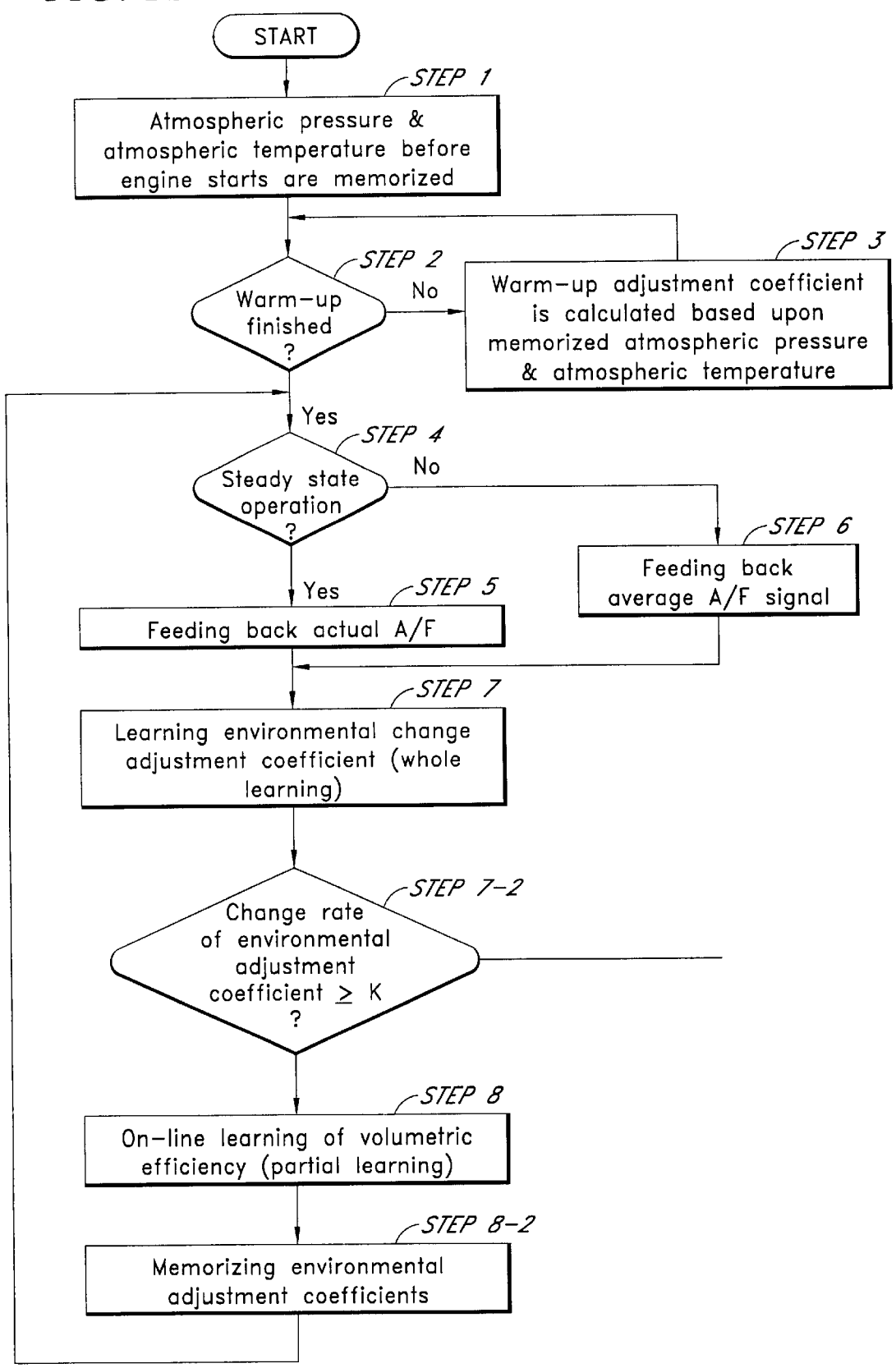
FIG. 11 is another flow chart to show another control routine of the learning executed in the control division shown in FIG. 5.

FIG. 11 illustrates another flow chart to show another control routine of the learning executed in the control division shown in FIG. 5.

This control routine is almost the same as the control routine shown in FIG. 10 except the following part. That is, between the steps 7 and 8 and after the step 8 in the former routine, each one step is added. The step 7-2 provided between the steps 7 and 8 is to determine whether a change rate of the environmental change adjustment coefficient is equal to or larger than a predetermined rate K. If this determination is positive, the control routine does not go to the step 8 and goes to the step 8-2. Then, the environmental change adjustment coefficient is memorized at this step 8-2. This means that if the environmental situation changes violently, the control device 71 determines not to learn the situation, i.e., the volumetric efficiency at this time. Then, the control device 71 memorizes the environmental change adjustment coefficient. Accordingly, the partial learning does not exert any influence to the whole learning.

Figure 12:
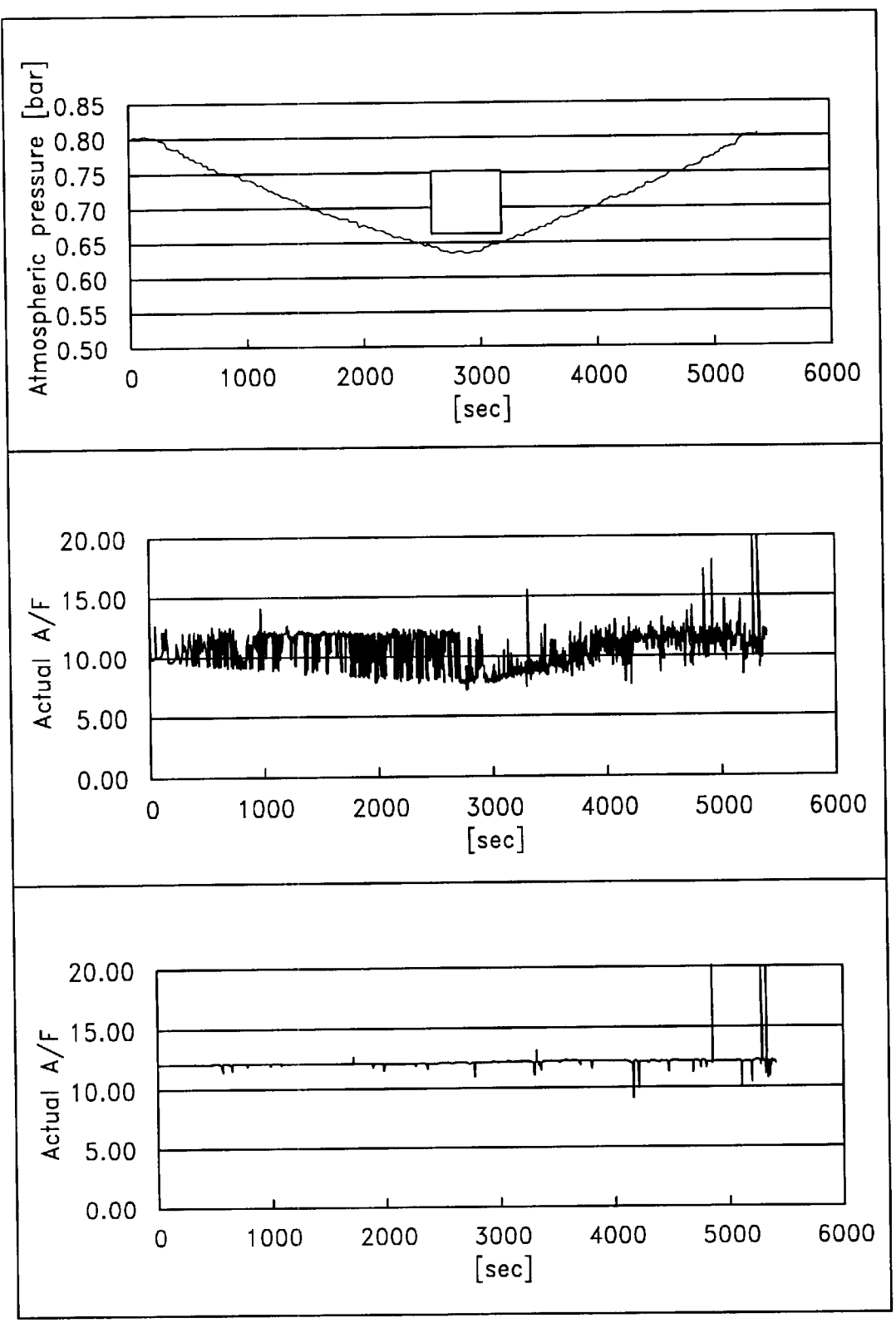
FIG. 12 is a graphical diagram containing three graphs. The top graph shows changes in atmosphere versus time when ascending halfway (5 gohme) of Mount Fuji and descending from there to the foot of the same mountain. The middle graph shows changes in actual air fuel ratio versus time under the control using a partial learning. The bottom graph shows changes in actual air fuel ratio versus time under the control using the combination of the partial learning and a whole learning. Meanings of the partial learning and the whole learning will be described shortly.

FIG. 12 illustrates a graphical diagram containing three graphs. The top graph shows changes in atmosphere versus time when ascending halfway (5 gohme) of Mount Fuji and descending from there to the foot of the same mountain. The middle graph shows changes in actual air fuel ratio versus time under the control using the partial learning. The bottom graph shows changes in actual air fuel ratio versus time under the control using the combination of the partial learning and the whole learning.

As seen in the middle graph, if only the partial learning is applied, the wave form contains the hard hunting and, in addition, the air fuel ratio is not controllable around the objective air fuel ratio 12.0. However, as seen in the bottom graph, if both of the partial learning and the whole learning are applied, the wave form hardly has any hunting and the fuel ratio is controllable almost at the objective air fuel ratio 12.0.

Figure 13A:
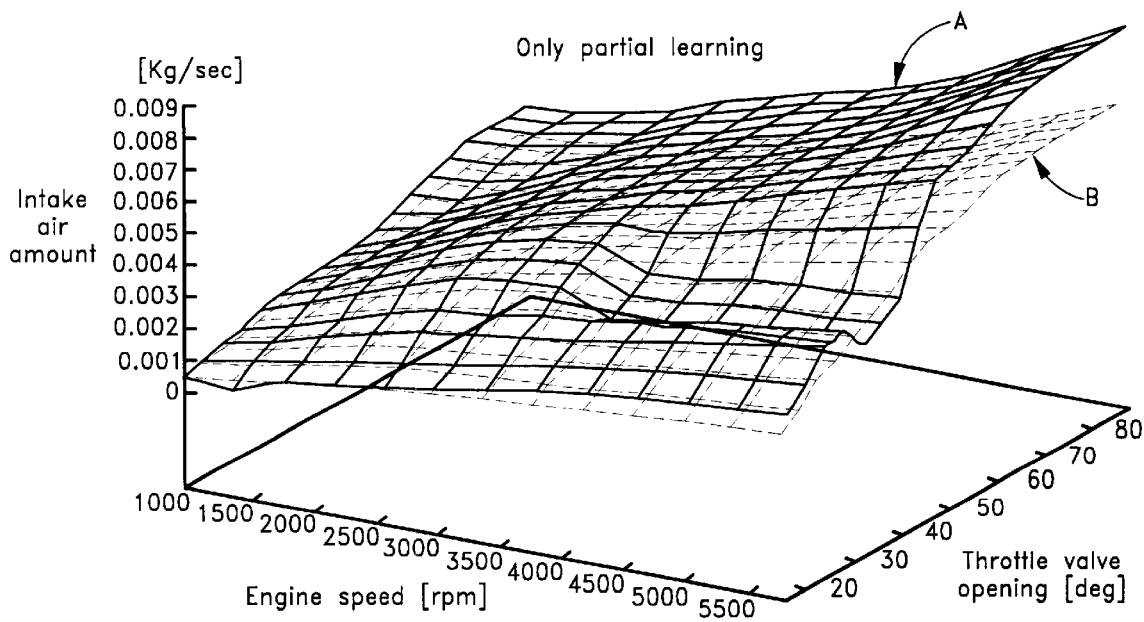
FIGS. 13A & 13B is a graphical diagram containing two graphs showing the relationship among the engine speed, the throttle valve opening and the air amount when reached at the middle part (5 gohme) of Mount Fuji.
Figure 13B:
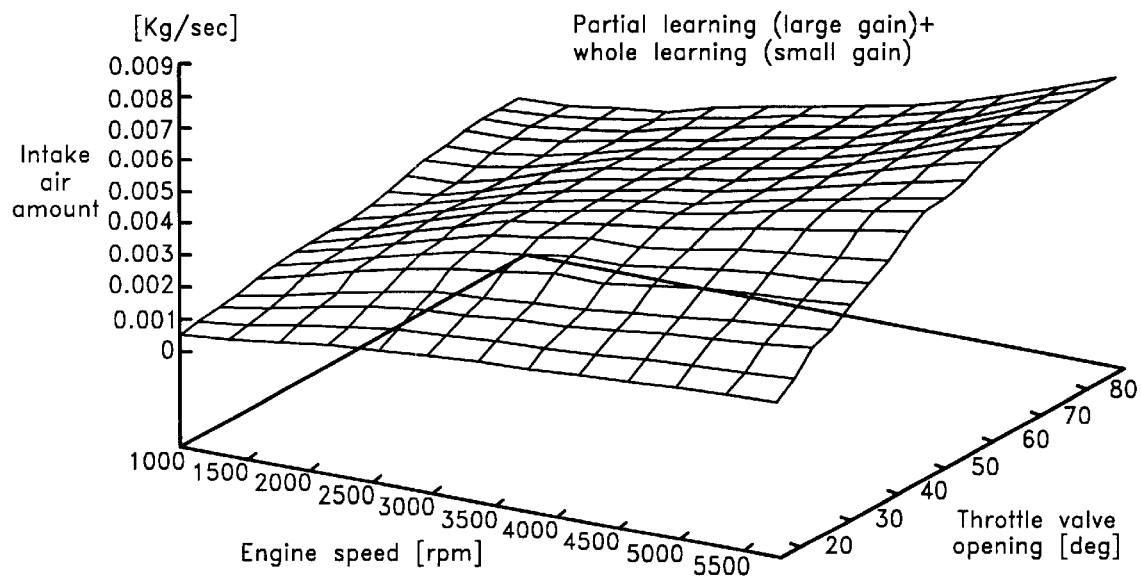

FIGS. 13A & 13B illustrates a graphical diagram containing two graphs showing the relationship among the engine speed, the throttle valve opening and the air amount when reached at the middle part (5 gohme) of Mount Fuji (see top graph of FIG. 12). FIG. 13A shows a result using the partial learning. FIG. 13B shows a result using the combination of the partial learning and the whole learning.

As seen in FIG. 13A, if only the partial learning is applied, there is a deviation between the output A as the result of the partial learning and the output B as the desired result. However, as seen in FIG 13B, if both of the partial learning and the whole learning are applied, there is no deviation between them.

It should be noted that other calculating models that can execute learning are applicable such as a neural network and a CMAC (cerebeller model arithmetic computer) instead of the fuzzy neural network. Advantages in applying the CMAC are, for example, the additional learning ability that is more superior to a strata-type neural network and the rapid learning ability. Also, genetic algorithms are applicable to optimize control parameters.

These neural network, CMAC and genetic algorithms are well known in the art. For example, Da Ruan (editor) "Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) can be referred to. These references are hereby incorporated by reference herein.

As described above, the partial learning and the whole learning are combined in accordance with one aspect of this invention. Because of this, learning can be executed on the unbiased basis and a machine will be accurately controlled.

Various Aspects of the Invention

As described above, the present invention includes various aspects as follows:

1). A control system for controlling performance of a machine, said control system comprising means for actuating the machine, a partial learning system for learning an control parameter determining an input and output of said means for actuating the machine based upon an error between an objective amount and an output amount of the machine as educator data to adjust said control parameter and a whole learning system for learning an adjustment coefficient based upon said error as educator data to adjust said adjustment coefficient.

2). In the item 1), said partial learning system has means for calculating an adjustment amount of said control parameter based upon said error.

3). In the item 2), said partial learning system further has a learning model for adjusting said control parameter by learning said adjustment amount of said control parameter as educator data in referring to an operating condition of said machine.

4). In the item 3), said whole learning system has means for calculating an adjustment amount of said adjustment coefficient based upon said error.

5). In the item 4), said whole learning system further has means for adjusting said control parameter by learning said adjustment amount of said adjustment coefficient as educator data.

6). In the item 3), said learning model is formed with a fuzzy neural network.

7). In the item 1), a learning rate of said partial learning system is larger than a learning rate of said whole learning system.

8). In the item 1), at least said partial learning system learns said control parameter on an on-line basis.

9). A control system for controlling an engine having an fuel injector for injecting fuel for combustion in a combustion chamber of said engine, said control system comprising means for actuating said fuel injector, a partial learning system for learning a change with age determining an input and output of said means for actuating said fuel injector based upon an error between an objective air fuel ratio and an actual air fuel ratio as educator data to adjust said change with age and a whole learning system for learning an adjustment coefficient based upon said error as educator data to adjust said adjustment coefficient.

10). In the item 9), said change with age is a volumetric efficiency.

11). In the item 9), wherein said engine further has an air intake device for admitting air charge into said combustion chamber, said objective air fuel ratio is changed based upon an amount of said intake air charge, and said adjustment coefficient is multiplied to said amount of said intake air.

12). In the item 9), said control system further comprises means for calculating an adjustment amount of said change with age based upon said error.

13). In the item 12), said control system further comprises means for determining whether said engine runs under a constant condition or under a transient condition, means for altering statistically said adjustment amount, and said means for determining whether said engine runs under a constant condition or under a transient condition determines that it is a constant condition said partial learning system applies said adjustment amount as it is and said means for determining whether said engine running under a constant condition or under a transient condition determines that it is a transient condition said partial learning system applies said adjustment amount altered by said means for altering statistically said adjustment amount.

14). In the item 9), said whole learning system has means for calculating an adjustment amount of said adjustment coefficient based upon said error.

15). In the item 14), said adjustment amount of said adjustment coefficient is related to an environmental change.

16). In the item 14), said control system further comprises means for determining whether said engine runs under a constant condition or under a transient condition, means for altering statistically said adjustment amount, and said means for determining whether said engine runs under a constant condition or under a transient condition determines that it is a constant condition said whole learning system applies said adjustment amount as it is and said means for determining whether said engine running under a constant condition or under a transient condition determines that it is a transient condition said whole learning system applies said adjustment amount altered by said means for altering statistically said adjustment amount.

17). In the item 9), said control system further comprises means for determining an adjustment amount under a warm-up condition and means for switching to one of said adjustment coefficient and said adjustment amount under a warm-up condition and when under a warm-up condition said means for switching to one of said adjustment coefficient and said adjustment amount switches to said adjustment amount under a warm-up condition.

Of course, the foregoing description is that of preferred embodiments of the invention, and various changes and modifications may be made without departing from the spirit and scope of the invention, as defined by the appended claims.

What is claimed is:

1. A method for controlling performance of a machine by a control system, which machine is operable by a causative signal, the performance of which machine is indicatable by an indicative signal, wherein the indicative signal outputted from said machine deviates from a pre-set target value of the indicative signal due to an internal change of said machine and from a pre-set target value of the indicative signal due to an external change of said machine while operating said machine, said control system comprising;

(i) a control unit configured to output a causative signal when receiving pre-selected signals, wherein the input-output relationship of said control unit is regulated by control parameters;
   (ii) a parameter-outputting unit configured to output a control parameter to said control unit at a parameter-outputting unit connection when said parameter-outputting unit receives pre-selected signals; and
   (iii) a compensation-outputting unit configured to output a compensation signal to said control unit at a compensation-outputting unit downstream of said parameter-outputting unit connection when receiving pre-selected signals; said method comprising the steps of:
   (a) detecting a discrepancy between the indicative signal outputted from said machine and the pre-set target value of the indicative signal for an internal change;
   (b) detecting a discrepancy between the indicative signal outputted from said machine and the pre-set target value of the indicative signal for an external change;
   (c) modifying the control parameter to compensate for the discrepancy detected in step (a), whereby the internal change in said machine is compensated for; and
   (d) modifying the compensation signal to compensate for the discrepancy detected in step (b), whereby the external change of said machine is compensated for.

2. The method according to claim 1, wherein said control unit further comprises:

a first discrepancy calculation unit configured to output and add a parameter compensation value to the output of said parameter-outputting unit when said first discrepancy calculation unit receives the indicative signal from the machine and the pre-set target value of the indicative signal for an internal change of said machine; and
   a second discrepancy calculation unit configured to output and add an external compensation value to the output of said compensation-outputting unit when said second discrepancy calculation unit receives the indicative signal from the machine and the pre-set target value of the indicative signal for an external change of said machine;
   wherein steps (a) and (b) are conducted by activating said first and second discrepancy calculation units, respectively, step (c) is conducted by feeding the combined output of said parameter-outputting unit and said first discrepancy calculation unit, back to said parameter-outputting unit to modify the control parameter, and step (d) is conducted by feeding the combined output of said compensation-outputting unit and said second discrepancy calculation unit, back to said compensation-outputting unit to modify the compensation signal.

3. The method according to claim 1, wherein step (c) is conducted on a real-time basis.

4. The method according to claim 1, wherein step (d) is conducted on a real-time basis.

5. The method according to claim 1, wherein steps (c) and (d) are conducted at first and second modification rates, respectively, said first modification rate being higher than said second modification rate.

6. The method according to claim 1, wherein said parameter-outputting unit comprises a neural network to output the parameter, wherein the input-output relationship is regulated by coupling coefficients which are adjusted based on the detected discrepancy.

7. The method according to claim 1, wherein said compensation-outputting unit comprises a neural network to output the compensation, wherein the input-output relationship is regulated by coupling coefficients which are adjusted based on the detected discrepancy.

8. A control system for controlling performance of a machine, which machine is operable by a causative signal, the performance of which machine is indicatable by an indicative signal, wherein the indicative signal outputted from said machine deviates from a preset target value of the indicative signal due to an internal change of said machine and from a preset target value of the indicative signal due to an external change of said machine while operating said machine, said control system comprising;

a control unit configured to output a causative signal when receiving pre-selected signals, wherein the input-output relationship of said control unit is regulated by control parameters;
   a parameter-outputting unit configured to output a control parameter to said control unit at a parameter-outputting unit connection when said parameter-outputting unit receives pre-selected signals, wherein the input-output relationship is regulated by coefficients, said coefficients being adjusted to modify the input-output relationship to compensate for a discrepancy between the indicative signal outputted from said machine and the pre-set target value of the indicative signal for an internal change, whereby the internal change in said machine is compensated for; and
   a compensation-outputting unit configured to output a compensation signal to said control unit at a compensation-outputting unit downstream of said parameter-outputting unit connection when receiving pre-selected signals, wherein the input-output relationship is regulated by coefficients, said coefficients being adjusted to modify the input-output relationship to compensate for a discrepancy between the indicative signal outputted from said machine and the pre-set target value of the indicative signal for an external change, whereby the external change of said machine is compensated for.

9. The system according to claim 8, wherein said control unit further comprises:

a first discrepancy calculation unit configured to output and add a parameter compensation value to the output of said parameter-outputting unit when said first discrepancy calculation unit receives the indicative signal from the machine and the pre-set target value of the indicative signal for an internal change of said machine, wherein the internal change is compensated for by feeding the combined output of said parameter-outputting unit and said first discrepancy calculation unit, back to said parameter-outputting unit to modify the control parameter; and a second discrepancy calculation unit configured to output and add an external compensation value to the output of said compensation-outputting unit when said second discrepancy calculation unit receives the indicative signal from the machine and the pre-set target value of the indicative signal for an external change of said machine, wherein the external change is compensated for by feeding the combined output of said compensation-outputting unit and said second discrepancy calculation unit, back to said compensation-outputting unit to modify the compensation signal.

10. The system according to claim 8, wherein said parameter-outputting unit comprises a neural network to output the parameter, wherein the input-output relationship is regulated by coupling coefficients which are adjusted based on the detected discrepancy.

11. The system according to claim 8, wherein said compensation-outputting unit comprises a neural network to output the compensation, wherein the input-output relationship is regulated by coupling coefficients which are adjusted based on the detected discrepancy.

* * * * *

UNITED STATES PATENT AND TRADEMARK OFFICE
CERTIFICATE OF CORRECTION

PATENT NO.    : 6,466,859 B1
DATED         : October 15, 2002
INVENTOR(S)   : Yoko Fujime It is certified that error appears in the above-identified patent and that said Letters Patent is hereby corrected as shown below:

<u>Title page,</u>
Insert -- [30] Foreign Application Priority Data,
           June 4, 1998 (JP), 10-155674 --.

Before Item [57], insert:
-- [74] *Attorney, Agent, or Firm,* Knobbe, Martens, Olson & Bear, LLP. --.

Signed and Sealed this

Fourth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,466,859 B1
DATED : October 15, 2002
INVENTOR(S) : Yoko Fujime

Page 1 of 1

It is certified that error appears in the above-identified patent and that said Letters Patent is hereby corrected as shown below:

<u>Title page,</u>
Item [73], Assignee, insert -- Yamaha Hatsudoki Kabushiki Kaisha, Iwata-shi, Shizuoka-ken, Japan -- as the Assignee.

Signed and Sealed this

Twenty-second Day of July, 2003

JAMES E. ROGAN
*Director of the United States Patent and Trademark Office*